Feb. 23, 1965 J. REID ETAL 3,170,763
PROCESS FOR THE ELECTROTHERMIC PRODUCTION OF CARBON DISULPHIDE
Filed May 28, 1962
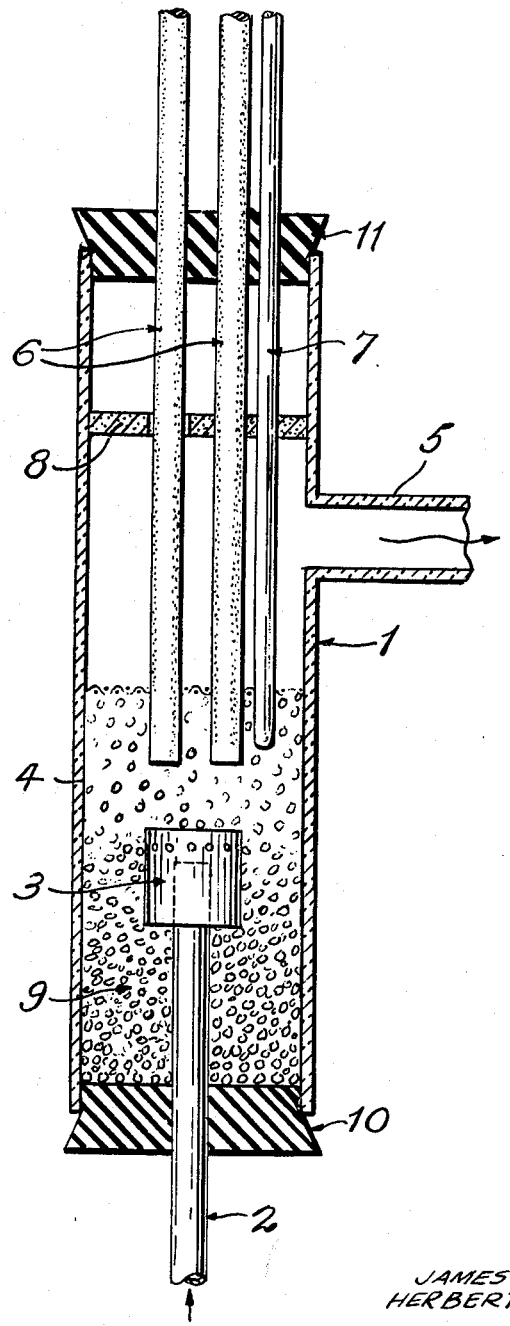
INVENTORS
JAMES REID
HERBERT S. JOHNSON
AGENTS 3,170,763
PROCESS FOR THE ELECTROTHERMIC PRODUCTION OF CARBON DISULPHIDE
James Reid, Shawinigan, Quebec, and Herbert S. Johnson, Shawinigan South, Quebec, Canada, assignors to Shawinigan Chemicals Limited, Montreal, Quebec, Canada, a corporation of Canada
Filed May 28, 1962, Ser. No. 198,339
9 Claims. (Cl. 23—206)

This invention relates to the production of carbon disulphide from hydrogen sulphide and normally gaseous hydrocarbons in a bed of electrically conductive fluidized carbon particles.

The production of carbon disulphide from hydrogen sulphide has long been known in the art. Methods of production have included the oxidation of hydrogen sulphide to sulphur and subsequent reaction of the resultant sulphur with carbon or hydrocarbons, the passage of hydrogen sulphide through a stationary bed of carbon at high temperatures, and the reaction between hydrogen sulphide and carbon particles in a fluidized carbon bed. Additionally, methane and hydrogen sulphide have been reacted in the presence of nickel sulphide or potassium dichromate catalysts at 900°–1100° C., but troublesome carbon deposits were built up during the reaction and no carbon disulphide was formed in the absence of a catalyst. In a somewhat similar manner, methane has been reacted with hydrogen sulphide at 1000–1300° C. in a porcelain tube pretreated with potassium dichromate, giving however, an extremely poor yield.

It is an object of the present invention to provide a method for the low cost production of carbon disulphide from normally gaseous hydrocarbons, for example from hydrogen sulphide containing natural gas sources.

It is a further object of the present invention to provide a method for the production of carbon disulphide by reacting hydrogen sulphide and normally gaseous hydrocarbons in an electrically heated fluidized bed, at temperatures in the range 900°–1500° C.

Accordingly, the invention consists of a process for the electrothermic production of carbon disulphide from a gas containing hydrogen sulphide and at least one normally gaseous hydrocarbon by passing the gas upwardly through a bed of finely divided electrically conductive carbon particles, maintaining the bed in a fluidized state by the passage of the gas, passing an electric current through the fluidized bed with sufficient power to maintain the fluidized bed in the temperature range 900°–1500° C., and recovering carbon disulphide from the gas coming from the bed.

The drawing shows diagrammatically a suitable apparatus for carrying out the process of the invention on a small scale, and is explained in more detail in the examples.

The process of the invention produces carbon disulphide in high yields, with no observable formation of by-products such as mercaptans or thioethers, and has the advantage of not requiring a catalyst. Yields can be increased by recycling the unconsumed hydrocarbon and hydrogen sulphide. Little or no carbon containing smoke, which might tend to clog the apparatus, is formed. Only a very small proportion of free sulphur is produced, and the amount deposited is insufficient to cause apparatus clogging. Thus the present invention gives a simple process for carbon disulphide manufacture from low cost, readily available gaseous materials in a continuous process with little tendency for by-product formation.

Although the reaction of hydrocarbons with hydrogen sulphide according to the process of this invention may be carried out at any temperature in the range of 900° C. to 1500° C. or higher, a preferred temperature range is 1100–1400° C. At temperatures below 1100° C. yields are undesirably low, while above 1400° C. problems are encountered in the selection of suitable materials of construction for high temperature operation. Additionally, at the higher temperatures, some of the hydrocarbon is cracked to carbon and hydrogen. The carbon formed by such a cracking reaction does not "soot out" and clog the reactor, but rather is deposited on the coke of the fluidized bed, leading to a slow increase of average coke size with time.

As the carbon-supplying feed for this process, any normally gaseous hydrocarbon can be used, as can mixtures of normally gaseous hydrocarbons. It is preferred to have as little air and water vapor as possible in the feed, since these substances may react with the coke of the fluidized bed to form carbon oxides or carbonyl sulphide, necessitating frequent coke replenishment. The relative amounts of hydrogen sulphide and hydrocarbon gas introduced into the reactor are not critical, as the unreacted gases merely pass through the reactor and may be separated from the product for recycle or recovery. Obviously, the use of any great excess of either reactant would impose additional cost due to the unnecessary heating of large volumes of gas which does not participate in the reaction. In commercial processes, therefore, economic considerations suggest a desirable range of feed gas ratios from approximately 1:20 to 20:1.

It is desirable although not essential to fluidize the bed while it is being heated to the reaction temperature with a non-reactive gas such as nitrogen or hydrogen, and it may be desired in some cases to admix such non-reactive gases as diluents with the hydrocarbon and hydrogen sulphide during reaction in order to increase the degree of bed fluidization.

The hydrocarbon gas and the hydrogen sulphide used in this process may be introduced into the reactor either as a common feed stream or in separate streams. In one preferred embodiment, a stream of natural gas which contains hydrogen sulphide is used as the reactor feed. A separate stream of pure hydrogen sulphide may simultaneously be passed into the reactor in order to increase the carbon disulphide yield based on the amount of hydrocarbon in the natural gas. This embodiment provides a method for making carbon disulphide from natural gas sources having high hydrogen sulphide contents, which render these sources unsuitable for the normal uses of natural gas.

The invention is illustrated by the following examples. It is understood that these examples serve as illustration only, and do not in any way limit the scope of the claims.

The reactor used in the examples is shown in the drawing. A 5 cm. (outside diameter) heat-resistant silica glass tube 1 was stoppered at both ends with rubber stoppers 10 and 11. An inlet tube 2 was led through the lower stopper 10 and a thermal insulation layer 9 to a graphite gas disperser 3. Suitable gas reservoirs, valves, and metering devices were provided so that either nitrogen or a mixture of a normally-gaseous hydrocarbon and hydrogen sulphide could be introduced through the tube 2. The metered gas so introduced was dried over calcium chloride immediately prior to introduction into the reactor. The electrically conductive bed 4 and thermal insulation 9 were formed of calcined fluid petroleum coke having a particle size sufficiently small to pass through a U.S. Sieve Series 50 mesh screen, i.e. through a sieve of 0.297 mm. The depth of the bed 4 before fluidization was approximately 10 cm. and its volume was approximately 150 cc. (The volume of the bed is the volume of the coke filled area above the level of the gas entry holes in the graphite disperser, with a correction for the volume occupied by the electrodes and the thermocouple well which extend into this zone.) Through the upper stopper 11, two 9.5 mm. (⅜ inch) diameter graphite electrodes 6 protruded into the tube 1, extending downwardly into the coke bed 4 for approximately 2.5 cm. with the bed in an unfluidized condition. A thermocouple well 7 also extended through the stopper 11 into the reaction chamber 1. Graphite radiant heat shielding 8 was attached to the electrodes 6 and the thermocouple well 7. A gas outlet tube 5 led from the side of the reactor 1 through a glass wool filter to two adsorption towers containing activated carbon. After each run, the towers were individually stripped with steam to distill adsorbed reaction products therefrom. Water and carbon disulphide were condensed from the steam distillation in a water-cooled condenser train, and were later separated in a separatory funnel. After passing through the condenser, the adsorbed gases from the towers (mostly hydrogen sulphide, with lesser amounts of hydrocarbon gas) were passed into a scrubbing tower containing a 10% aqueous sodium hydroxide solution. This caustic solution was subsequently analyzed to ascertain the balance of the sulphur in the reaction. In each example listed below, the reactor was started using nitrogen as the fluidizing gas, and the feed was changed to a hydrocarbon-hydrogen sulphide mixture when the desired reaction temperature was attained.

The reactor was heated and maintained at reaction temperature by applying a variable voltage to the electrodes by means of an autotransformer, and by varying the voltage in order to maintain sufficient current between the electrodes to sustain the desired temperature. Voltages in the range 85–115 volts and currents in the range 15–25 amperes were required with the uninsulated glass reactor used in the examples.

Examples 1–8

In typical experiments, the following conditions and results were achieved:

| Example Number | Hydrocarbon Fed | $H_2S$/Hydrocarbon Molar Ratio | Duration (minutes) | Reactor Temp. (°C.) | Total Gas Flow Rate (cc./min.) (0° C., 760 mm. Hg) | Gram-Moles $H_2S$ Fed | Calculated Contact Time (sec.) | Weight of Crude $CS_2$ (g.) | Percent Yield of $CS_2$ on $H_2S$ Fed |
|---|---|---|---|---|---|---|---|---|---|
| 1 | $CH_4$ | 2.0/1 | 170 | 1,200 | 1,107 | 5.63 | 0.75 | 110.0 | 51.4 |
| 2 | $CH_4$ | ¹ 1.99/1 | 170 | 1,300 | 1,217 | 6.10 | 0.64 | 129.5 | 56.0 |
| 3 | $CH_4$ | ¹ 1.99/1 | 160 | 1,300 | 732 | 3.42 | 1.07 | 62.2 | 47.9 |
| 4 | $CH_4$ | 1.92/1 | 150 | 1,200 | 733 | 3.21 | 1.14 | 67.2 | 55.0 |
| 5 | $CH_4$ | 1.92/1 | 70 | 1,200 | 2,370 | 4.84 | 0.35 | 98.0 | 53.3 |
| 6 | $CH_4$ | 0.956/1 | 129 | 1,200 | 1,940 | 5.55 | 0.43 | 134.1 | 64.6 |
| 7 | $C_3H_8$ | 4.38/1 | 100 | 1,200 | 1,867 | 6.78 | 0.45 | 159.2 | 61.7 |
| 8 | $CH_4$ | 0.087/1 | 160 | 1,200 | 1,225 | 0.70 | 0.68 | 12.6 | 47.4 |

¹ The feed gas mixture used in Examples 2 and 3 contained 1.8% nitrogen, which was taken into account in calculating the yield. The inert gas content of the feed in the other examples was negligible.

The Calculated Contact Time is an approximation of the time of contact between the fluidizing gas and the carbon of the bed in seconds, calculated on the average flow rate, taking into account the following factors and assumptions:

(1) The apparent density of the carbon bed before fluidization is approximately 60% of the real density of the carbon particles. This indicates that the proportion of voids in the unfluidized bed ((i.e. spaces between carbon particles) is about 40% of the total volume of the bed.

(2) The volume of the bed when fluidized is about 10% greater than the volume before fluidization. Thus, the gas volume in the fluidized bed will be approximately 50% of the volume of the bed in its unfluidized state.

(3) Gas flowing into the fluidized bed is assumed to be raised substantially instantaneously to the temperature of the bed, with an instantaneous proportional volume increase according to Gay-Lussac's law. The flow rate of gas entering the reactor, in the table above, is corrected to standard conditions (760 mm. Hg pressure 0° C.).

No correction is made for the increase in gas volume as a result of the chemical reaction occurring in the bed.

The expression for the Calculated Contact Time is thus as follows:

Calculated Contact Time (sec.) =

$$\frac{0.50 \text{ (volume of unfluidized bed, cc.)}}{\text{(Corrected volume of feed)}\text{(sec.)}} \frac{\text{(Reaction temperature, °K.)}}{(273 \text{ °K.})}$$

Example 9

A feed stream comprising 35.3% methane and 63.5% $H_2S$ (balance inert gas) was fed into the same apparatus used in the previous examples. With a constant gas flow rate, the reaction temperature was varied from 900° C. to 1400° C. stepwise in 100° C. increments by varying the voltage applied to the electrodes. Samples of gas leaving the reactor were taken at a point before the off-gas stream was led through the active carbon towers, and were analyzed by gas chromatography methods for carbon disulphide, hydrogen sulphide and methane. From the composition of the off-gas at each temperature, the hydrogen sulphide conversion and carbon disulphide yields were calculated. The results were as follows:

| Temp., °C. | Percent $H_2S$ Conversion | Percent $CS_2$ Yield | |
|---|---|---|---|
| | | On $H_2S$ Fed | On $H_2S$ converted |
| 1,400 | 59.7 | 60.0 | 100.5 |
| 1,300 | 63.0 | 55.2 | 87.5 |
| 1,200 | 61.0 | 54.6 | 89.7 |
| 1,100 | 52.4 | 41.2 | 78.4 |
| 1,000 | 58.7 | 28.7 | 48.8 |
| 900 | 22.7 | 9.7 | 42.8 |

The process of this invention has special utility as a method of recovering or consuming hydrogen sulphide which is produced as a byproduct in the existing process for making carbon disulphide from sulphur and normally gaseous hydrocarbons, e.g. methane according to the reaction $$CH_4 + 4S \rightarrow CS_2 + 2H_2S$$

Additionally the process of the invention has the advantage that it permits the recovery of the hydrogen values as hydrogen from the reactants hydrogen sulphide and hydrocarbons.

From the foregoing description, it can be seen that the present invention provides a simple and economical process for preparing carbon disulphide from hydrogen sulphide and normally gaseous hydrocarbons in excellent yield and highly satisfactory conversion. It will be understood that many variations may be made in the specific expedients described without departing from the scope of the invention which is defined in the following claims.

What is claimed is:

1. A process for the electrothermic production of carbon disulphide from hydrogen sulphide and at least one normally gaseous hydrocarbon as the sole reactants in the absence of catalysts for carbon disulphide formation, which process comprises passing a gaseous mixture of hydrogen sulphide and at least one normally gaseous saturated hydrocarbon upwardly through a bed of finely-divided electrically conductive carbon particles, maintaining the bed in a fluidized state by the passage of said gaseous mixture therethrough, passing an electric current through the resulting fluidized bed with sufficient power to maintain the fluidized bed in the temperature range 900–1500° C., and recovering carbon disulphide from the gas coming from the bed.

2. A process according to claim 1 in which the temperature of the fluidized bed is maintained in the range 1100–1400° C.

3. A process according to claim 1 in which the normally gaseous saturated hydrocarbon is introduced into the fluidized bed in admixture with the hydrogen sulphide.

4. A process according to claim 1 in which the normally gaseous saturated hydrocarbon and hydrogen sulphide are introduced into the fluidized bed as a plurality of streams.

5. A process according to claim 4 in which at least one stream comprises a major proportion of hydrogen sulphide and at least one stream comprises a major proportion of hydrocarbon gas.

6. A process according to claim 1 in which the gaseous mixture is a mixture of natural gas and added hydrogen sulphide.

7. A process according to claim 1 in which the gaseous mixture additionally includes a nonreactant diluent gas.

8. A process according to claim 1 in which said normally gaseous saturated hydrocarbon is methane.

9. A process for the electrothermic production of carbon disulphide from natural gas which contains hydrogen sulphide, the sole reactants being the saturated hydrocarbon gas and the hydrogen sulphide in said natural gas, said reaction being carried out in the absence of catalysts for carbon disulphide formation, which process comprises passing natural gas which contains hydrogen sulphide upwardly through a bed of finely-divided electrically-conductive carbon particles, maintaining the bed in a fluidized state by the passage of said natural gas therethrough, passing an electric current through the resulting fluidized bed with sufficient power to maintain the fluidized bed in the temperature range 900–1500° C. and recovering carbon disulphide from the gas coming from the bed.

References Cited in the file of this patent

UNITED STATES PATENTS

| | | |
|---|---|---|
| 2,536,680 | Folkins et al. | Jan. 2, 1951 |
| 2,882,130 | Porter | Apr. 14, 1959 |
| 3,009,781 | Johnson et al. | Nov. 21, 1961 |
| 3,034,863 | Johnson et al. | May 15, 1962 |
| 3,079,233 | Wenzke | Feb. 26, 1963 |

FOREIGN PATENTS

| | | |
|---|---|---|
| 565,280 | Canada | Oct. 28, 1958 |
| 486,848 | Italy | Nov. 18, 1953 |